Nov. 3, 1953

R. R. HULL 2,657,554

LIQUID DISPENSER

Filed Aug. 21, 1951

Inventor:
Robert R. Hull
by
Attorney.

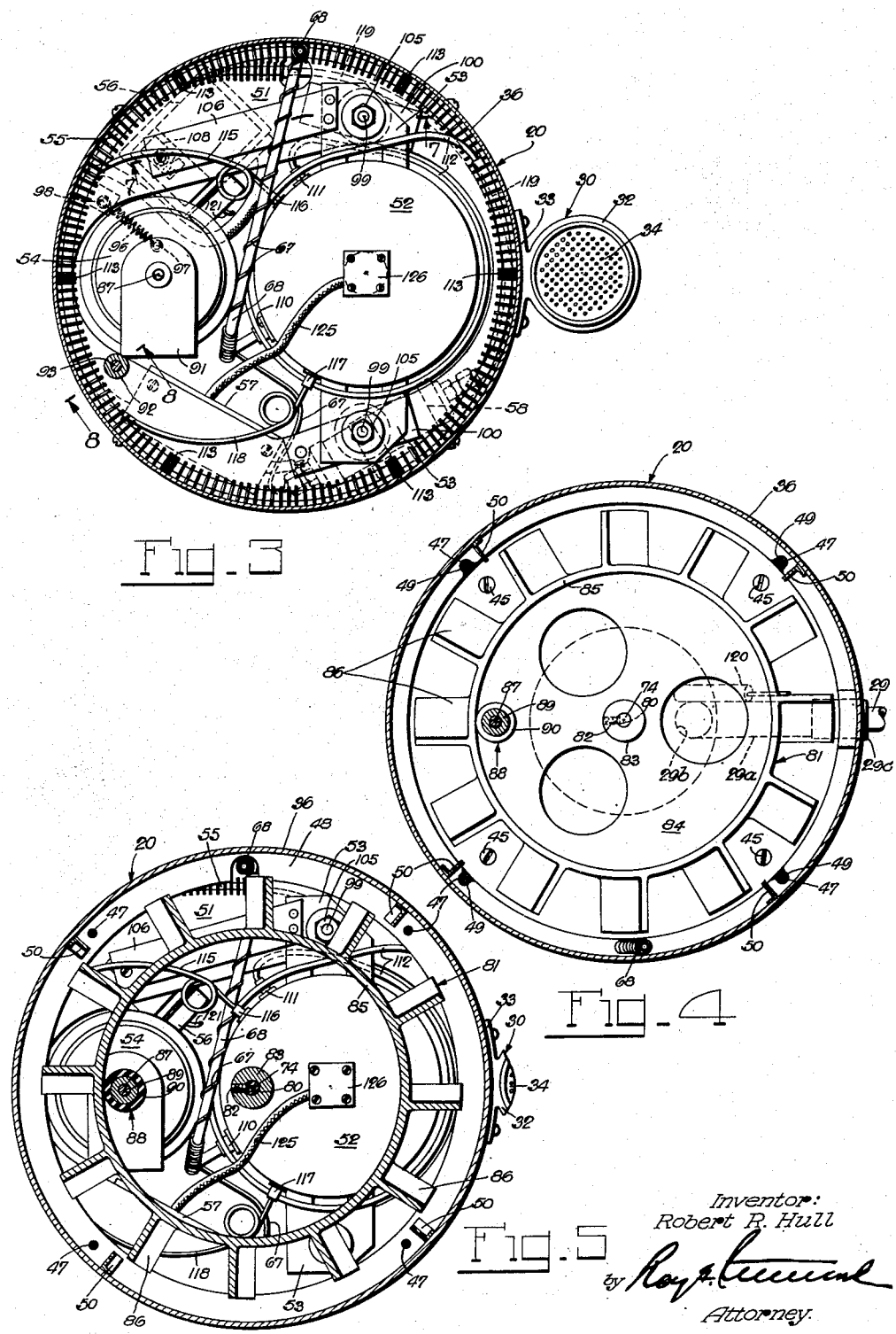

Patented Nov. 3, 1953

2,657,554

UNITED STATES PATENT OFFICE 2,657,554

LIQUID DISPENSER

Robert R. Hull, Pasadena, Calif., assignor, by mesne assignments, to Roy F. Steward, Merrill F. Steward, and Donald T. Steward, all of Meriden, Conn.

Application August 21, 1951, Serial No. 242,953

5 Claims. (Cl. 62—141)

This invention relates to liquid dispensers and especially to dispensers of the type adapted for temporarily storing in a suitable reservoir a quantity of a beverage from which portions are withdrawn upon demand for delivery to a customer. More particularly, the invention is directed to dispensers of the foregoing type having incorporated in them means for maintaining the beverage in a potable condition, comprising heat transfer means disposed within the beverage reservoir for effecting desired temperature control of the beverage, and an agitator cooperating with the heat transfer means to effect better and more uniform temperature control of the beverage. The agitation also serves the purpose of maintaining any solids or semi-solids in uniform suspension throughout the body of the beverage. The latter problem is encountered more particularly in the dispensing of fruit and vegetable juices, which is one of the most common uses of devices of this kind. While it is within the purview of the present invention to provide means for heating beverages, such as coffee or cocoa for example, and maintaining them in a heated condition, it is a primary purpose to provide a dispenser incorporating a refrigerating system in which the heat transfer means disposed within the beverage is a cooling coil, and the description which follows is accordingly directed principally to such an embodiment.

The design and construction of such dispensers often present numerous and sometimes quite conflicting problems, one of the principal of these being the requirement on the one hand for compactness of size and on the other the provision of a sufficient supply of beverage at the desired temperature. Another is that of designing a dispenser in which there is a minimum opportunity for unsanitary conditions to arise, and correspondingly one in which all parts coming into direct contact with the beverage are accessible for cleaning. Particularly important in this connection is the necessity for having as few movable parts as possible, such as bearings, in contact with or closely adjacent the beverage. Also the dispenser must of course be one which is practical to build and operate from an economical standpoint. On top of all this, the dispenser must have an attractive appearance and the beverage should be clearly visible so that when the unit is placed out where it can be seen by the customers, it will encourage the sale of the beverage.

Taken individually, the foregoing requirements might present little difficulty, yet when taken in the aggregate, considerable compromise has usually been necessary in arriving at a commercially practical device. These, and other problems attendant upon the design of a dispenser will be discussed briefly in outlining the various objects achieved by the novel dispensers embodying the inventive concept disclosed herein, whereby many of the compromises heretofore thought necessary are avoided.

In general, the dispenser comprises a housing which constitutes a base upon which a reservoir is supported, much as in the base of the well-known water coolers. The base contains most of the various accessories necessary for properly maintaining the beverage in potable condition, and is provided on its upper surface, as an integral part of the base, a central column or post which extends upward a distance just short of the maximum height of the reservoir. This post contains the refrigerating coil for cooling the beverage and carries an agitator for keeping the beverage stirred up within the reservoir. The latter fits down over the post, the post passing through what may be termed the mouth of the reservoir which is positioned at the bottom, as for example, by inverting a large jar. A liquid seal is provided at the jar mouth where it rests on the top surface of the housing to prevent undesired outflow of beverage. The top of the jar, that is, what would normally constitute its bottom, is cut away and filling is accomplished by pouring the beverage into the open upper end thus provided. A dispensing outlet, opening into the mouth of the reservoir at the top of the housing and within the sealing joint there provided, allows beverage to be withdrawn by gravity flow as desired.

As mentioned above, one of the primary considerations in dispensers of this type is that of smallness of size since it is highly desirable that such a dispenser not consume more than a minimum amount of space in order that it can conveniently be placed, for example, on a shelf or counter. This object is achieved in dispensers embodying the present invention, while at the same time a unit capable of holding a fairly large supply of beverage is provided. For example, the unit which is specifically illustrated in the accompanying drawings and described in detail hereinafter has a beverage capacity of from 2½ to 3¾ gallons, yet occupies less than one square foot of counter space and is only about thirty inches high. This unit is completely self-contained, having a glass beverage container or reservoir supported upon a cylindrical housing of about the same size as, or only slightly larger than, the reservoir itself. Within this housing all of the necessary agitating and refrigerating means are enclosed except that which is necessarily in contact with the beverage in the reservoir, so that there is thus provided a compact unit which at the same time attractively displays the beverage in the reservoir.

One of the difficulties encountered in thus compacting the various component parts of the dispenser, and particularly where a compressor and condenser of a refrigerating system are placed within the housing for protection as well as for the sake of better appearance, has been that of obtaining adequate cooling of these enclosed parts. The obvious expedient of course is to employ a fan which draws air into the housing over the various parts so as to afford some measure of cooling and thereby prevent excessive operating temperatures. Usually however, because of space limitations, the rate of air flow into the housing has had to be rather high, with the result that dirt, lint, and even splashed beverage have been drawn into the unit and deposited on the parts and have plugged up the holes in the housing through which air is drawn. Not only does this lower the ability of these parts to transfer excessive heat to the ventilating air, but it can also give rise to very unsanitary conditions, requiring frequent and thorough cleaning, which has not always been practical. It is accordingly one of the objects of the invention to provide adequate cooling or ventilating air at substantially reduced velocity, and concurrently without increase in the overall size of the unit.

In the manner of beverage storing and cooling also, the dispenser described herein incorporates several novel features, particularly with respect to a very compact and mechanically simple combination of beverage cooling coil, beverage agitator and accessory housing ventilating fan. For reasons which will be discussed presently, it is preferred to use as the beverage container a glass bottle or jar having inwardly sloping shoulders leading to a mouth of good size but of something less than the full diameter of the jar. As mentioned above, the usual bottom of the jar is cut out and it is supported in an inverted position on top of the housing where its mouth is received within a socket having suitable gasket means to effect a liquid seal. The use of a reservoir having a restricted mouth opening, however, immediately introduces a limitation as to maximum diameter of both the agitator and the cooling coil if the latter are to be mounted integrally with the base or housing and are to project upward through the restricted mouth and into the beverage container itself, as is desirable for effecting most efficient cooling and if the jar is to be removable for cleaning or replacement. It is therefore an object of the invention to provide suitable beverage cooling means capable of satisfying these requirements. A further object is to incorporate with such cooling means an agitating device which, although capable of being run at relatively high speed, does not cause turbulence in the beverage. Turbulence is to be avoided if possible since it is likely to cause a distinct change in taste of certain beverages, particularly in citrous fruit juices. This change in taste arises apparently from entrapment of air which is whipped into the beverage during the turbulence. Furthermore, high agitator speeds are apt to cause a vortex to be formed in the beverage in the container, reducing the useful capacity of the container because of the liability of the beverage to spill over the top of the container. In the present device, these and other objects are achieved by the use of a novel combination including a substantially columnar cooling element of small diameter which can fit into the mouth of the reservoir and a helically formed agitator which encircles the cooling element and is rotatable about the latter in close proximity to its surface to effect a wiping action of the liquid with respect to such surface.

In the above discussion it was mentioned that the use of a shouldered bottle or jar as a reservoir is preferred and the reason for this is that it offers several advantages over straight sidewalled containers which outweigh the possible inconvenience of the smaller mouth opening. In the first place, the length of the liquid sealing joint between the mouth of the jar and the socket on top of the housing is substantially shortened, and this is an important factor as will be readily apparent to those familiar with the problems encountered in attempting to fasten transparent materials to metallic refrigeration surfaces in a sanitary manner. Secondly, and perhaps more importantly, the use of a container which has inwardly sloping shoulders adjacent its bottom is particularly effective, in combination with the centrally disposed cooling coil and agitator mentioned above, in producing a toroidal circulation of the beverage within the reservoir, which not only promotes better contact of the beverage with the cooling column but also ensures better distribution of any fruit pulp or similar suspended solid matter throughout the entire body of the beverage. There is also the point that, because of the reduced or comparatively small capacity of the lower end of such shouldered containers in comparison with the upper part, there is much less "last end" beverage left in the container after the liquid height falls to the point where, from the sales viewpoint, it is undesirably low. This last juice presents a sales or disposal problem whenever it becomes necessary to remove the beverage container for a thorough clean-up, which ordinarily must be done every day or two at least, and the result is that this "last end" portion of beverage must usually be thrown away since in most cases it cannot be added to the fresh beverage when the container is refilled without undesirably affecting the taste and salability of such fresh beverage.

In view of the fact that the design of the agitator disclosed permits a relatively high agitator speed without creating turbulence in the beverage reservoir, the same shaft which carries the agitator may be used to carry a ventilating fan for supplying the necessary air to cool the refrigerating system components housed within the dispenser, and it is a purpose of the invention to take advantage of this to effect a simplification in the construction of a dispenser. It is a still further feature of the present invention to employ this fan as a means for accomplishing a speed-reducing drive whereby a small, high-speed, low-power, electric motor can be used to drive the fan and agitator directly without the use of an expensive gear-type reducer unit.

With these and other objects in view, which will become apparent as the description proceeds, the invention comprises the novel features of construction and the combination thereof which are illustrated by a specific form of dispenser now in commercial use and shown in the following drawing, wherein Fig. 1 is a perspective view of a dispenser embodying the invention;

Fig. 2 is a sectional view in side elevation of the dispenser shown in Fig. 1;

Figs. 3, 4, 5 and 6 are cross-sectional plan views of the dispenser accessory housing at various levels, looking in the direction of the arrows along lines 3—3, 4—4, 5—5 and 6—6, respectively, in Fig. 2;

Fig. 7 is a fragmentary, detailed view, partly in section, of a torque buffering means forming a part of the compressor mounting assembly;

Fig. 8 is a fragmentary view in cross-section of the arrangement for mounting the agitator drive motor; and Fig. 9 is a schematic wiring diagram of the electrical system for controlling the operation of the dispenser.

Figure 1:
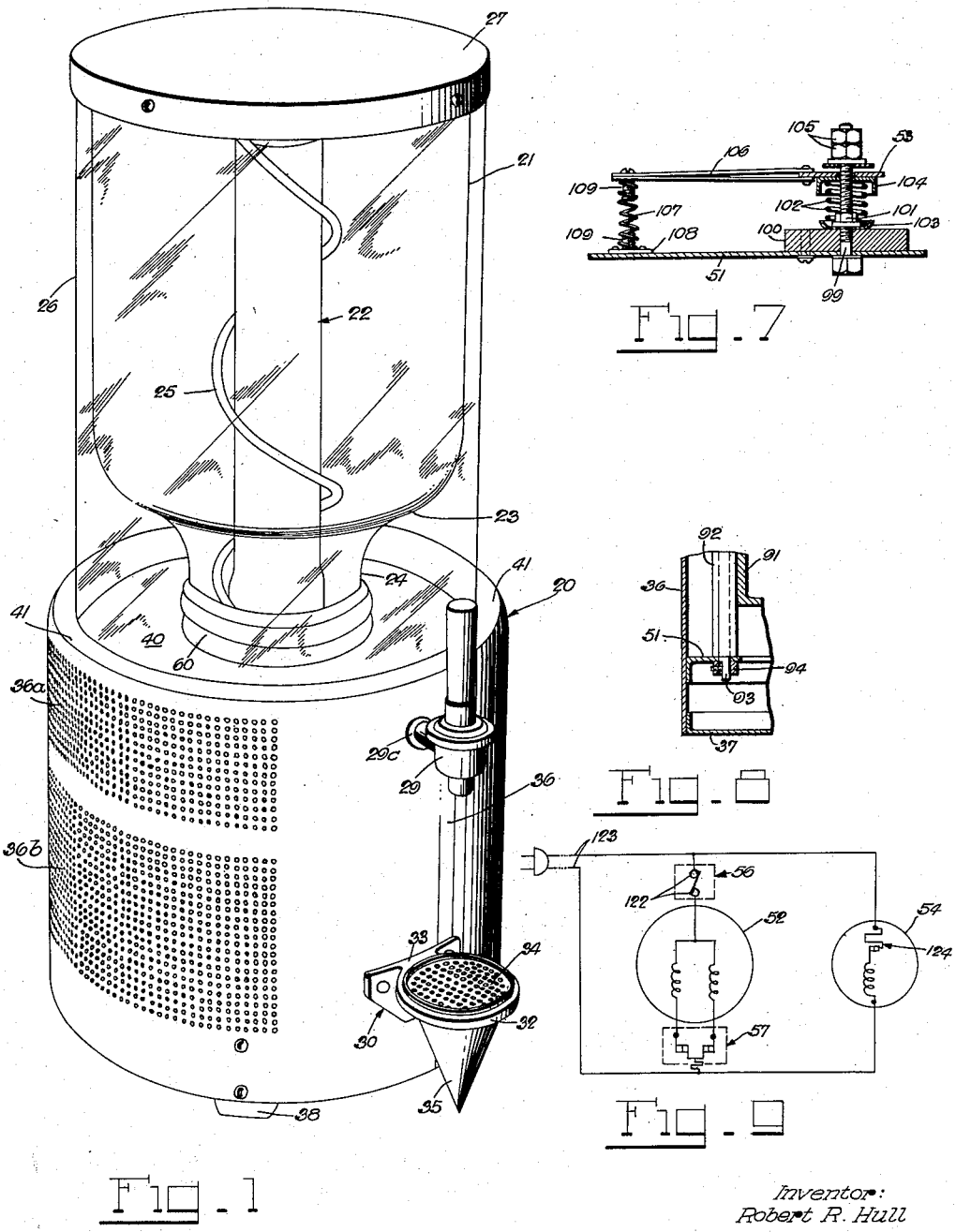

In general, the dispenser illustrated in the drawings comprises a cylindrical housing 20 which serves as a mounting base for a large inverted bottle or jar-like reservoir 21 and for a cooling column 22 which projects centrally upward from the top of housing 20 through the mouth and neck of the reservoir 21 to a point adjacent the top of the latter. The reservoir is of the shouldered type having inwardly sloping shoulders 23 which terminate in a neck 24 providing a mouth of substantial size but of somewhat smaller diameter than that of the reservoir at its maximum point. In order to permit filling of the reservoir, what would ordinarily be termed the bottom of the jar is completely cut away, so that when it is placed in an inverted position on the housing, the top of the reservoir is open for the reception of the beverage. Column 22 is provided with a helically formed agitator rod 25, the relatively wide-spaced turns of which encircle the column throughout its extent close to the surface thereof. Agitator 25 is supported for rotation about the longitudinal axis of the column, in a manner which will be brought out presently, whereby, when it is rotated, the turns of the helix are caused to have a progressive movement axially along the surface of the column. The dispenser also incorporates a transparent plastic or glass outer cover 26 having a metal dome 27 across the top thereof. This cover also rests on top of housing 20 and encloses the reservoir. If desired, the outer cover may be omitted and a domed cover, such as cover 28 shown in Fig. 2, placed directly on the reservoir. Normally, however, inner cover 28 is omitted if an outer cover is employed.

The other components of the dispenser which are immediately visible from an external inspection are a valved dispensing outlet 29 through which beverage is withdrawn, and a support 30 removably attached to the side of housing 20 upon which a glass 31 or the like can be placed while the beverage is being dispensed. Support 30 comprises a ring 32 having a bracket 33 integrally secured thereto and by which it in turn is secured to the wall of housing 20. The support is provided with a perforated disc or plate 34 on which the glass 31 sits, and any drip of beverage from the dispensing valve 29 after removal of the glass is caught by a suspended cup 35 within which an ordinary paper cup 35a is carried. Cup 35a is replaceable by merely lifting out the disc 34 and withdrawing the cup upwardly from the supporting cup 35.

Figure 2:
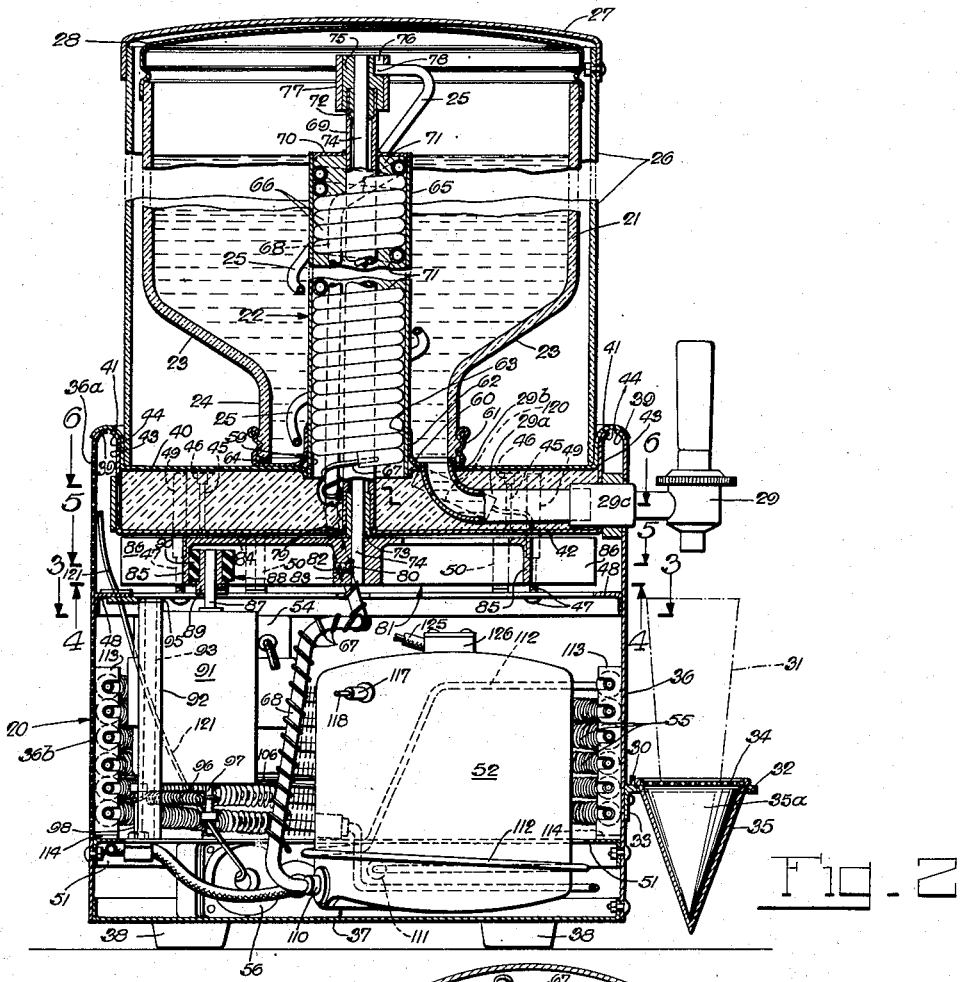

The housing 20 comprises a cylindrical side wall 36 having upper and lower foraminous areas 36a, 36b, somewhat spaced apart vertically through which air can be caused to pass for ventilation of the units enclosed therein, as will be hereinafter described. Housing 20 is provided with a circular bottom cover plate 37 suitably secured to wall 36, and rubber mounting feet 38 provide a resilient vibration-dampening mount spacing the dispenser away from a shelf, counter or the like on which it may stand when in actual use. The upper edge of wall 36 is formed inwardly to provide a curled lip 39, and a dished top cover 40 having an upwardly-extending, outwardly-curled rim or flange 41 is positioned on top of wall 36 so that the rim 41 mates with the lip 39 in overlapping relation thereto. A pan 42, which is more deeply dished than cover 40, is positioned directly below the latter in spaced relation thereto. Pan 42 has an upstanding annular side wall 43 rolled outward slightly at 44 along its upper edge to form a lip which seats within the rim 41 of top cover 40. Long screws 45 pass through pan 42 and are received in threaded bushings 46 on the under side of top cover 40 to secure the pan in position below the cover and provide an interspace between the two. After assembly, this interspace is filled with a thermal insulating material to prevent the heat of the accessory units housed below from reaching the refrigerated beverage above. The assembled top cover 40 and pan 42 are secured to the upper end of cylindrical wall 36 by means of screws 47 which pass through a peripherally flanged partition 48 into threaded engagement with bushings 49 spaced circumferentially about and secured to the upstanding annular wall 43 of pan 42. Partition 48, disposed horizontally within housing 20 at the level of the separation between the upper and lower foraminous areas 36a, 36b, is welded to wall 36 at points along its peripheral flange, thus dividing said housing into upper and lower compartments which, however, are in communication with each other through a central opening in partition 48, as shown (Fig. 2). Additional support is also provided by four brackets 50 which are evenly spaced around the circumference of the partition and are welded to both the partition and the wall 36. These brackets also serve an additional purpose which will be brought out hereinafter. Hold-down screws 47 thus seat the rim 41 of cover 40 securely on lip 39 of housing 20 by pulling down on the top cover and insulation pan assembly.

Housing 20 also contains another horizontally disposed partition or shelf 51 which is peripherally flanged and is bolted to the housing at a level only a short distance above the bottom cover 37. This shelf serves as the main support for practically all of the accessory units within housing 20. The shelf is cut out centrally to provide a generally pear-shaped aperture, and a self-contained, sealed, motor-compressor refrigerating unit 52 is suspended by means of laterally extending mounting brackets 53 within the aperture thus provided. The drive motor 54 for agitator 25 is also carried in part by this shelf, as well as a spirally coiled refrigerant condenser 55, a thermal switch assembly 56, a compressor motor starting and overload relay 57 and a cartridge-type refrigerant drier 58. The operation and detailed arrangement of these components will be discussed more fully hereinafter.

Top cover 40 is provided with a central circular hole 59, the periphery of which is rolled downward slightly, and an annular socket member 60, having outer and inner upstanding side walls 61, 62, respectively, is permanently secured to the upper surface of the cover with its central hole 63 in registry with hole 59. The outer flange 61 of socket 60 is threaded to receive the threaded portion of the neck of the reservoir which screws down into the socket against a gasket 64 to make a liquid tight seal. Column 22 fits snugly within the registering holes 63 and 59 of the socket and top cover, respectively, and the cylindrical shell 65 of the column is welded to the face of flange 62 and the downwardly rolled lip of aperture 59 so as to secure the column in fixed vertical upright position on top of housing 20. The outlet means by which beverage is withdrawn from the reservoir comprises a tube or elbow 29a disposed within the interspace between top cover 40 and pan 42. One end of the tube is welded into a hole 29b in cover 40 and socket 60, intermediate column 22 and the neck wall of the reservoir. The other end of tube 29a is received within an adapter 29c which extends through and is secured within registering openings in wall 43 of pan 42 and wall 36 of housing 20. The valved dispensing outlet 29 then screws into the outer end of this adapter.

Within the shell 65 of column 22 there is positioned a close-wound spiral coil 66 of copper tubing which forms the expansion or cooling coil of the refrigerating system. The diameter of the coil is such that the outer extremity or periphery of its turns is in contact with the inner surface of the shell. A capillary tube 67 leads into the tubing at the lowermost coil thereof for the introduction of condensed refrigerant at that point—which is subsantially in the plane of the mouth of jar 21—the capillary tube being sealed into the end of cooling coil 66 and being supplied with refrigerant from the compressor and condenser in housing 20. At the top end of the cooling coil 66, a return line 68 leading to the return or low-pressure side of the refrigerating system, passes downwardly within the cooling coil between the turns of the latter and a centrally disposed sleeve 69. This sleeve extends beyond shell 65 at each end thereof and is centered at its upper end by a cap 70 through which the sleeve passes and to which it is welded. Cap 70 forms a closure for the upper end of the shell 65 and is welded around its periphery to the upper edge thereof in liquid-tight manner. The remaining space within shell 65 is filled with a thermally conductive composition 71 which serves to hold the cooling coil firmly in place and promotes more effective refrigeration by the coil by providing larger surface contact with the shell 65. The filler may be solder or, preferably, a good grade of transformer sealing compound.

Each end of sleeve 69 is counterbored and bearings 72, 73, are pressed into the opposite ends of the sleeve. A shaft 74 is rotatably carried in these bearings and has secured to its upper end an inverted, cup-shaped hub 75 which seats down over the upper end of sleeve 69 so as to form an apron or skirt to prevent any beverage from getting into the bearing surfaces, particularly when filling the reservoir. Hub 75 has a radially extending slot 76 cut out of its upper edge forming a keyway by which agitator 25 is keyed to the shaft 74. To accomplish this and to hold the agitator in proper alignment with the shaft, the upper end of the spiral agitator rod is bent inward so as to project radially through a hole drilled in the side wall of a cylindrical sleeve 77. The rod is welded fast with sleeve 77, the inner end 78 of agitator 25 extending inwardly beyond the inner wall of the sleeve a short distance. Sleeve 77 is adapted and arranged to slide axially down over hub 75 in close mating engagement, the inwardly directed stub 78 of agitator 25 fitting into the keyway 76 of the hub and resting against the bottom of the keyway to prevent the agitator and sleeve from sliding down beyond a desired position. Thus the agitator 25 may be simply lifted off the upper end of shaft 74 whenever it is desired to do so.

The lower end of sleeve 69 is held centered with respect to shell 65 by abutment against pan 42 where it is welded in registry with a central hole 79 therein. Shaft 74 extends through the lower sleeve bearing 73 a short distance and is provided with a flat 80 in its periphery. An impeller wheel 81 is mounted on the lower end of the shaft and a set screw 82 passing through hub 83 of the wheel 81 is turned in against flat 80 to lock the wheel onto the shaft. The impeller wheel, as shown best in Figs. 2, 4, and 5, comprises a flat, disc-like central portion 84 surrounded by an annular rim 85 extending downwardly substantially at right angles to the central portion. Extending radially outward from the periphery of the rim 85 and integrally connected thereto in evenly spaced arrangement around it is a series of impeller blades 86, so that as the wheel is rotated it acts as a fan for creating a current of air. In the example here illustrated, the wheel is rotated in a counter-clockwise direction as viewed from above (Fig. 5) so that air is drawn centrally in through the perforations in the lower area 36b of wall 36, from which it passes up through the central opening in partition 48 and is pushed radially outward through the upper formanious area 36a by the impeller blades. The radially disposed brackets 50 mentioned previously function as baffles to force the air out through area 36a and prevent "stalling-out" of the impeller by continuous recirculation of air around its circumference within the housing. Rotation of the impeller wheel, and consequently of agitator 25, is effected by the small driving motor 54 which is pivotally supported intermediate partition 48 and shelf 51 so that its shaft 87 is disposed vertically. As shown in Figs. 2, 4 and 5, motor 54 is provided with a driving puck or friction roller 88 secured to the upper end of shaft 87. Puck 88 comprises a bushing 89 to which is bonded a grommet 90 of rubber or similar material. Motor 54 is supported between the horizontally extending arms of a substantially C-shaped motor mounting bracket 91 (Figs. 2, 3, and 5) having a bearing 92 secured along a vertical edge thereof. A hinge pin 93 extends upwardly through a bushing 94 secured to the under surface of the lower supporting shelf 31, through a registering hole in the shelf and through bearing 92 into a bushing 95 secured to the under surface of partition 48. Pin 93 is prevented from falling out by means of a set screw in lower bushing 94 which engages a flat on the lower end of the pin, as seen best in Fig. 8. Thus, motor 54 may be swung in a horizontal arc about pin 93 to move the driving puck 88 into and out of engagement with the inner surface of annular rim 85 of the impeller wheel 81. This arcuate swinging movement provides a take-up arrangement by which the engagement of the driving puck 88 with rim 85 is automatically maintained, an extension spring 96 for this purpose being stretched between a post 97 on bracket 91 and a second post 98 standing upright from shelf 51 (see Fig. 2). The foregoing construction furnishes a particularly simple means of effecting a substantial speed reduction between the motor and agitator shafts because of the great difference in diameters of puck 88 and the inner periphery of rim 85 of the impeller. Thus a small high-speed motor of relatively low power can be used, and the necessity for an expensive and often troublesome gear type speed reducer is eliminated.

The refrigerating system of the dispenser is more or less conventional except for the construction and arrangement of the condenser. Any suitable type of motor-compressor unit may be employed. However, the unit here shown generally at 52 is most advantageously one of a well known commercially available type characterized by the fact that it is a particularly compact sealed unit in which the refrigerant vapor returning from the cooling coil is compressed and partially cooled in a section of the condenser, after which it is returned to the motor winding enclosure space of the sealed unit for cooling the compressor motor and perhaps also effecting some cooling of the compressor before it goes to the main section of the condenser where it is actually condensed. As adapted for use in the dispenser here illustrated, the compressor unit 52 is suspended, as mentioned previously, by brackets 53, which extend laterally therefrom and overlie the peripheral lower shelf 51 within housing 20 (Figs. 3 and 5). Each of these brackets is secured to the shelf by means of a shock mount (Fig. 7) comprising a central bolt 99 which passes through shelf 51 and a reinforcing plate 100, the bolt being attached thereto by a nut 101, as seen in Fig. 7. A compression spring 102 surrounds bolt 99 and is held in position between a lower spring cup 103 and an upper cup 104. Bolt 99 passes loosely through a hole in the bracket and the latter sits on top of cup 104. A lock-nut assembly 105 on the upper end of the bolt prevents the bracket from jumping off the upper end of the bolt but allows some play to occur. One of the brackets 53 is provided also with a torque buffering arm 106 which is suitably fastened to the bracket so as to be rigid with it and to extend generally at right angles thereto, as seen more particularly in Figs. 3, 5, and 7. A buffering spring 107 is disposed between the underside of arm 106 and a small plate 108 fastened to shelf 51. Spring 107 is threadedly engaged at its opposite ends by suitably threaded bushings 109, one of which is secured to the under side of arm 106, while the other is fastened to plate 108. In this manner, spring 107 resists both compression and extension as the result of up-and-down arcuate movement of arm 106. Such movement, of course, results from the reaction of the torque developed during starting of the compressor unit 52, more particularly, and it is necessary to prevent excessive movement of the unit so that it does not interfere with and damage other components positioned close by within housing 20. The arm also helps to reduce any rocking movement of the compressor unit 52 during shipment of the dispenser which might cause damage to the unit.

Compressor unit 52 draws expended refrigerant vapor through return line 68 from cooling coil 66 into the housing of the unit at coupling 110 adjacent the bottom thereof, compresses it and passes it out through a coupling 111, also adjacent the bottom of unit 52, to a tube 112 which encircles unit 52 and feeds the compressed vapor into the top coil of condenser 55. The condenser comprises a plurality of closely spaced turns of integrally finned copper tubing which is held in place by a series of suitably notched angle brackets 113 to hold the turns of the condenser in evenly spaced relation to each other, as seen best in Figs. 2 and 3. The diameter of the turns of the condenser is only slightly less than that of housing 20 of the dispenser, so that when placed in the latter, the turns are positioned closely adjacent the inner surface of cylindrical wall 36. Brackets 113 have feet 114 by which they are secured to shelf 51 so as to extend upright therefrom for supporting the condenser adjacent the inside of the lower, larger, foraminous area 36b of wall 36. Thus the condenser presents a maximum area of exposed surface to the entering air for a minimum overall size. Furthermore such arrangement enables efficient use of the space within the turns of the condenser for the other accessory units, as shown, so that they also are compactly placed, yet assured of adequate cooling.

Refrigerant which has been partially cooled in the top few turns of condenser 55 is led off through a tube 115 to a coupling 116 in the housing of compressor 52 for cooling the motor and compressor as mentioned above. It then emerges through a coupling 117 from which it is returned to the condenser by tube 118. The fully condensed refrigerant then emerges from the bottom turn of the condenser and is led by tube 119 to the cartridge type drier 59. From the drier, the refrigerant is led to the cooling coil for expansion by the capillary tube 67 whose length is designed to provide the necessary restriction to the flow of refrigerant therethrough such that the rate of evaporation in the cooling coil provides the desired rate of cooling by the coil, as is conventional. In this case, the capillary tube is wrapped around the refrigerant return line 68 and soldered to it throughout its length in order to promote good heat transfer and thus take advantage of the cooling effect of return line 68 for further cooling and condensing the refrigerant in the capillary. This arrangement serves also as a convenience in mounting the fine tube in a manner to prevent damage from vibration and the like. Expansion of the refrigerant as it leaves the capillary and within the low-side cooling coil 66 effects the refrigeration of the beverage in reservoir 21 in conventional manner.

Figure 6:
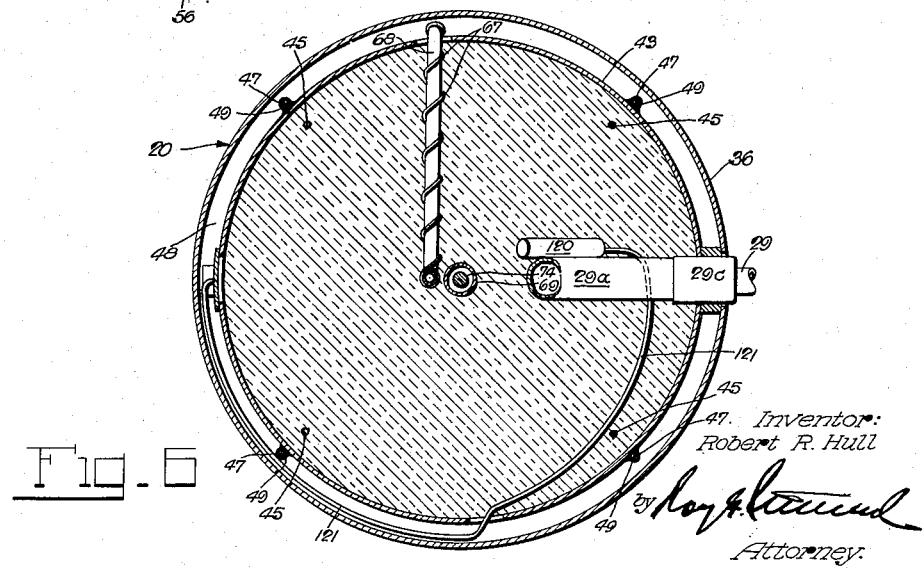

Operation of the compressor unit is controlled by a temperature bulb 120 clamped or otherwise suitably secured in direct contact with outlet tube 29a at the bend thereof, just below the mouth of the reservoir, so that its temperature is the same for all practical purposes as that of the beverage which will be next dispensed. And, because the lower end of agitator rod 25 is in close proximity to the inner end of outlet tube 29a, circulation carries into the tube and the temperature at bulb 120 closely approximates that of the main body of the liquid. As seen in Figs. 2 and 6, bulb 120 is connected by a thin tubing 121 to the bellows of the thermal switch 56, which in the dispenser here shown is commercially available in various different forms for this purpose. Bulb 120 and tube 121 are filled with a fluid which transmits to the bellows in the thermal switch changes in volume occasioned by temperature changes at bulb 120. Switch 56 has a set of electrical contacts 122 (Fig. 9) which are closed by the bellows whenever the temperature in bulb 120 rises above a pre-set maximum and are opened upon the temperature reaching a desired minimum. Normally, a range from a minimum temperature of about 35° F. to a maximum of about 40° F. is deemed most desirable for storing citrous fruit juices.

Referring again to the schematic circuit diagram in Fig. 9, it will be seen that the circuit from power lines 123 to the motor of the compressor unit 52 is interrupted by switch 56, whereby the unit operates only intermittently in response to the need for refrigeration as called for by temperature bulb 120. On the other hand, the agitator and impeller drive motor circuit is always closed directly across power lines 123 so that it runs continuously to provide constant agitation of the beverage. In the case of both of these motors there is a thermal overload protective device incorporated to prevent burn-outs. Overload relay 57 takes care of the compressor motor and motor 54 has a thermal cut-out 124 built in to it for its protection. Actual electrical connection to the compressor is made by a power cord 125 leading from the enclosure for the overload relay 57 to a plug 126 which plugs into a socket at the top of unit 52.

It will be noted that in the construction of the dispenser here shown, the lower foraminous area 36b in wall 36 which is adjacent the condenser 55 is approximately twice the area of the upper area 36a. This is necessary because of the restriction imposed by the condenser, as well as the compressor unit 52 and drive motor 54, to the flow of air through area 36b, whereas a much smaller perforated area for the exit air can be used owing to the absence of interfering objects adjacent the upper area without causing excessive velocity at any one point. It will also be noted that no perforations are made in the housing wall 36 adjacent the dispensing outlet 29, so that there is no tendency for beverage which may accidentally be splashed during the dispensing operation to be drawn into the housing.

The particular combination of central cooling column and helical agitator encompassing it has been found particularly effective, both from an operational standpoint as well as from economical one in the construction of a refrigerating type of dispenser. By feeding the refrigerant into the bottommost turn of the spiral cooling coil, the coil is more advantageously flooded or wetted with refrigerant, while at the same time preventing excessive liquid refrigerant from leaving the coil and passing on over into the return line with consequent loss of refrigeration capacity. The helical agitator, in turn, provides efficient circulation of the beverage, particularly in combination with a shouldered reservoir as mentioned previously. Mechanical simplification is also provided by this construction owing to the fact that the ventilating fan can be mounted on the same shaft as the agitator, so that, excepting the motors, there is but a single rotating shaft and only two bearings in the entire dispenser.

The invention may be carried out in other specific ways than that set forth in the foregoing description of a particular dispenser, without departing from the spirit and essential characteristics thereof. As mentioned earlier, dispensers embodying the novel features pointed out hereinabove may incorporate heating means in place of the refrigerating system specifically illustrated. In such case, the central column 22 can be heated by supplying steam to an enclosed coil similar to coil 66, or an electrical resistance heater can be enclosed within the column. The foregoing example is, therefore, to be considered in all respects as illustrative and not restrictive, and all changes coming within the meaning and equivalency of the appended claims are intended to be embraced therein.

What is claimed is:

1. In combination in a liquid dispenser: an open-top liquid reservoir having inwardly sloping shoulders adjacent its lower end which terminate in a neck-portion of reduced size having an open mouth therein; a housing having a cover upon which said reservoir is supported; coupling-and-sealing means secured to said cover to engage the neck-portion of said reservoir to support the latter in upright position on said cover and to form a liquid-tight seal with said open mouth; an outlet tube for dispensing liquid from said reservoir, one end of which is in communication with said open mouth of the reservoir; a substantially cylindrical, vertical column of smaller diameter than said mouth, said column being secured to said cover so as to project upwardly into said reservoir through said mouth; a refrigerating system including a cooling coil disposed in said column, also a compressor and a condenser located within said housing; a helical agitator encircling said column in closely spaced relation thereto, and mounted upon a shaft which extends axially downward through said column into said housing below said cover, is supported for rotation within said column, and has a flanged wheel secured to its lower end; driving means located in said housing adapted and arranged to engage the flange of said wheel to rotate the latter and thereby rotate said agitator, whereby to effect a flow of liquid vertically along the surface of said column, said inwardly sloping shoulders of said reservoir serving to direct the circulating liquid inwardly toward said column; a partition dividing said housing into upper and lower compartments which are in communication through an opening in said partition, the housing having portions of its side wall apertured at locations respectively above and below the partition; and impeller means carried by said flanged wheel and so disposed in cooperative relation to said opening in the partition that, upon rotation of said wheel, air is drawn into said housing on one side of said partition and forced out of the housing on the other side of the partition.

2. The combination as defined in claim 1, wherein said refrigerating system condenser comprises a spirally coiled tube mounted within one of the compartments of said housing so that its turns are disposed closely adjacent an apertured side-wall portion thereof whereby air is caused to pass over said condenser by said impeller means.

3. In combination, a liquid reservoir and an outlet for dispensing liquid from said reservoir; a housing having a cover upon which said reservoir rests; a refrigerating system having a compressor and a condenser enclosed within said housing below said cover and a cooling coil which projects above said cover into said reservoir and forms vertical columnar liquid-cooling means therein; an agitator helically encircling said columnar cooling means; a shaft upon which said agitator is mounted, said shaft extending axially downward through said columnar cooling means into said housing below said cover; a bearing for rotatably supporting said shaft in the aforesaid manner; a flanged wheel secured to the lower end of said shaft within said housing; and driving means located in said housing for engaging the flange of said wheel to rotate the latter thereby rotating said agitator to effect a flow of liquid in said reservoir along the surface of said columnar cooling means, said driving means comprising an electric motor having a projecting shaft to which a friction roller is secured, said motor being pivotally mounted on a vertical axis below said flanged wheel for horizontal swinging movement to engage said roller with, or to disengage it from, the wheel flange, and spring means normally maintaining said motor in a position wherein such engagement is effected; a partition dividing said housing into upper and lower compartments which are in communication through an opening in said partition, the housing having portions of its side wall apertured at locations respectively above and below the partition; and impeller means carried by said flanged wheel and so disposed in cooperative relation to said opening in the partition that, upon rotation of said wheel, air is drawn into said housing on one side of said partition and forced out of the housing on the other side of the partition.

4. The combination as defined in claim 3, wherein said refrigerating system condenser comprises a spirally coiled tube mounted within one of the compartments of said housing so that its turns are disposed closely adjacent an apertured side-wall portion thereof whereby air is caused to pass over said condenser by said impeller means.

5. The combination as defined in claim 3, which further includes baffle plates disposed radially in spaced relation around the periphery of said impeller means to direct air radially outward through an apertured portion of said side wall, said baffle means serving in addition to support said horizontal partition within said housing.

ROBERT R. HULL.

References Cited in the file of this patent

UNITED STATES PATENTS

| Number | Name | Date |
|---|---|---|
| 453,084 | Lemon | May 26, 1891 |
| 823,740 | Reams | June 19, 1906 |
| 1,796,916 | Bonnheim | Mar. 17, 1931 |
| 1,954,518 | Downer | Apr. 10, 1934 |
| 2,282,627 | Weiss | May 12, 1942 |